July 2, 1935.  G. W. BAUGHMAN  2,006,785
ELECTRIC BRAKE DEVICE
Filed Nov. 17, 1933
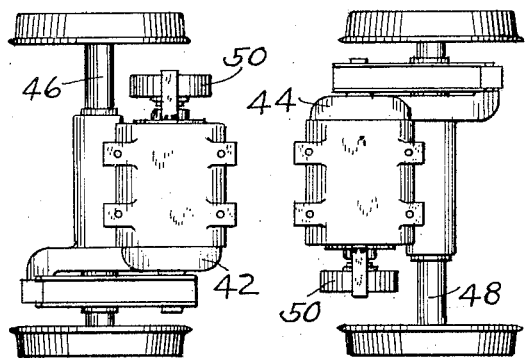
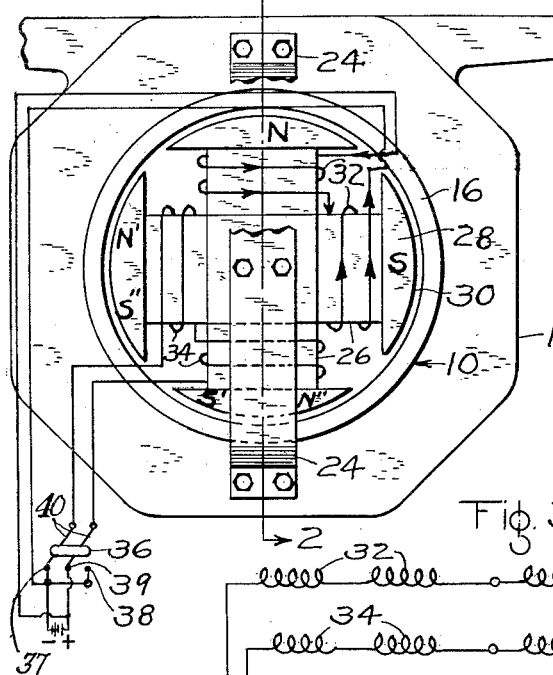
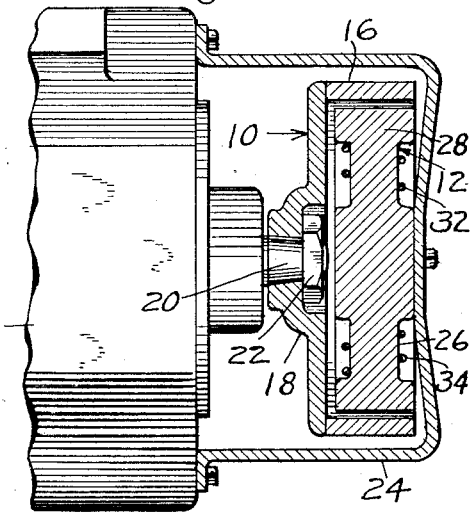
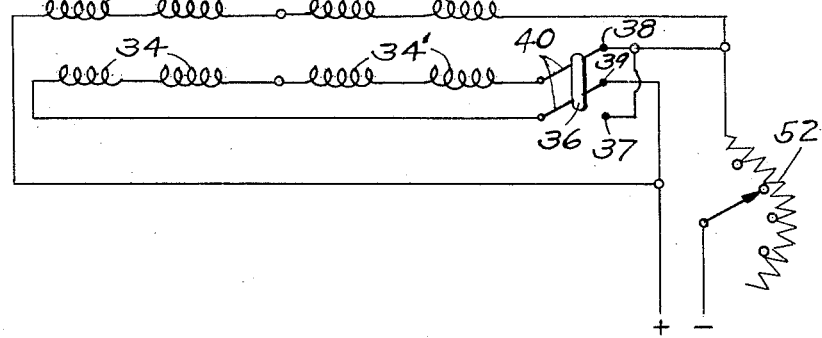
INVENTOR
GEORGE W. BAUGHMAN
BY
*Wm. M. Cady*
ATTORNEY Patented July 2, 1935

2,006,785

UNITED STATES PATENT OFFICE 2,006,785

ELECTRIC BRAKE DEVICE

George W. Baughman, Edgewood, Pa., assignor to The Westinghouse Air Brake Company, Wilmerding, Pa., a corporation of Pennsylvania Application November 17, 1933, Serial No. 698,398

21 Claims. (Cl. 188—104)

This invention relates to vehicle brakes, and more particularly to an electro-dynamic brake device of the eddy current type.

An inherent characteristic of the now commonly known eddy current type brake is that the braking effect produced thereby, while holding fairly constant over a wide range of speeds, diminishes as the speed of the vehicle being braked approaches zero. As a consequence the braking effect must be augmented at low speeds by use of a friction brake, so as to bring the vehicle to a stop quickly. The use of the eddy current brake of usual design has therefore been limited to the higher speeds of a vehicle, where it is more effective, and a friction brake has been used at the lower speeds.

It is a general object of my invention to provide an improved eddy current brake which will be effective not only at the higher vehicle speeds but also at the lower speeds, down to a point where a friction brake is required to do only a fraction of the work formerly required of it.

Another object is to provide an improved eddy current brake having a rotor and a multi-polar stator with means for changing the number of magnetic poles on the stator during a braking operation to change the braking characteristic of the brake. For example, assume a vehicle equipped with an ordinary eddy current brake having a rotor and a two-pole stator, with driving connections between the vehicle and rotor such that when the vehicle is traveling at a maximum speed of say 45 miles per hour the frequency of the currents generated in the rotor will be 70 cycles per second. Now it is possible to design an ordinary type eddy current brake to have characteristics such that a substantially constant or uniform braking effect will be produced from the maximum speed for which the brake is designed, as for example 45 miles per hour in this case, down to approximately half of maximum speed, as for example 20 miles per hour in this case, after which the braking effect diminishes rapidly to zero at zero speed. At 20 miles per hour the rotor current frequency would be 31 cycles per second, so that between frequencies of 70 and 31 cycles per second a substantially constant braking effect is maintained, but below this range the braking effect diminishes rapidly. If when the vehicle speed drops to 20 miles per hour the two-pole stator of the brake were quickly changed to a four-pole stator, without materially interrupting the braking action, the rotor current frequency would be changed to 62 cycles per second, after which the braking effect would be maintained relatively constant for another period instead of diminishing rapidly, as it is chaacteristic of this type of induction apparatus that the torque (braking effect in a brake) will remain relatively constant over a certain range of frequencies.

Other and more specific objects will be apparent from the ensuing description, illustrated in the attached drawing, in which, Fig. 1 is a diagrammatic view of one embodiment of my invention.

Fig. 2 is a view along the line 2—2 of Fig. 1.

Fig. 3 is a schematic arrangement of windings of two brakes embodying my invention, showing a method of interconnection for control purposes.

Fig. 4 illustrates one adaptation of my improved brake in connection with drive motors associated with vehicle axles.

Referring now particularly to Figs. 1 and 2, I have shown an embodiment comprising a rotor 10 and a stator 12 associated with a vehicle driving motor 14, although these may be associated with any other part which rotates as the vehicle moves.

The rotor 10 is shown as being of cup-like form, having an annular flanged portion 16, preferably of a good quality of magnetic iron or steel, secured in any suitable manner to a hub portion 18, preferably of non-magnetic material such as brass, copper, bronze or the like. The hub portion 18 is firmly held on a shaft 20 of the vehicle motor 14, as by a nut 22, so that the rotor rotates with the shaft 20.

The stator 12 is mounted within but spaced from the cup-like rotor 10, and a bracket 24 is provided for supporting the stator from the motor 14 in this position. The stator has four pole members 26, each being provided with a pole piece 28 having a face 30 corresponding to the inner periphery of the rotor flanged portion 16. Two of the pole members 26 have windings 32 thereon, which may be connected in series, as shown, or in parallel, but which are disposed on the two poles in such a manner that when connected to a source of current supply the current traverses the winding on one pole member in a direction opposite to the current in the winding on the other pole member, such for example as is shown by the arrowheads on the turns of the diagrammatically indicated windings 32. Thus the two pole members 26 embraced by the windings 32 have magnetic fluxes produced therein of opposite relative polarity.

The two other pole members 26 have similar windings 34 disposed thereon in a like manner to that of windings 32, that is, so that current flowing in the windings 34 produces magnetic fluxes in the two pole members embraced thereby of opposite relative polarity. Windings 34 are, however, connected to a reversing switch 36, so that they may be first energized by current flowing in one direction therethrough, and subsequently by current flowing in an opposite direction therethrough, to change the magnetic polarity of these two pole members to produce a two-pole stator at one time and a four-pole stator at another time, for a purpose and in a manner to be more fully hereinafter described.

As is shown, the reversing switch 36 has three contacts 37, 38 and 39, the contacts 37 and 38 being connected to one conductor leading to a source of current supply and the contact 39 being connected to another conductor of relatively opposite polarity leading to the same source of supply. Contact arms 40 of the switch are moved between these three contacts to effect the current reversals previously referred to. Windings 32 and 34 preferably receive current from the same source of supply.

In operation, when a vehicle equipped with my improved brake is in motion the rotor 10 is rotating correspondingly. To produce a braking effect current is supplied to the windings 32 and 34 in any suitable manner and to the same degree, in accordance with the desired braking effect. Also, if the vehicle is traveling at a high rate of speed, as for example between its maximum and half of maximum speed, a more constant braking effect will be produced if the windings 32 and 34 are connected to the current supply so as to produce a two-pole brake. If for the sake of clearness we assume that the direction of current flow in windings 32 remains fixed so as to establish fixed "north" and "south" poles as indicated by the letters N and S, respectively, then the switch 36 must be moved to the right in Fig. 1, bringing arms 40 in contact with contacts 38 and 39, so as to cause current to flow in windings 34 in a direction to produce "north" and "south" poles as indicated by the letters N' and S', respectively. It will thus be observed that when these conditions obtain stator 12 is in effect a two-pole stator. The rotor 10 will therefore rotate in a magnetic field produced by two poles and will have currents generated therein having a frequency corresponding to two poles, and of course also to the speed of rotation of the rotor. These currents will react with the field producing them to cause a braking effect on the vehicle which will at the higher speeds be fairly constant.

As the speed of the vehicle diminishes, due to the braking effect produced by the brake, a point will be reached, at or about half of maximum vehicle speed, at which the braking effect is no longer relatively constant, but begins to decrease rapidly. If at or about this point, which is readily predetermined in design, the switch 36 is moved to the left, to the position shown in Fig. 1, the direction of current flow in windings 34 will be immediately reversed, with the result that the polarity of the poles formerly indicated by N' and S' will now be as indicated by the letters N" and S", that is, just reversed from that previously obtaining. The stator will then in effect be a four-pole stator, and the rotor will rotate in a four-pole magnetic field, thus having currents generated therein of a frequency twice that with the two-pole stator. The frequency thus being raised the braking effect will continue to be relatively constant down to a speed far below the point realized with a fixed number of poles, although as the vehicle speed approaches closely to zero the braking effect will decrease, becoming zero at zero speed. For the relatively low speeds where the braking effect is diminishing rapidly a friction brake is used to bring the vehicle to a stop rapidly.

One of the factors influencing the braking characteristic of the eddy current brake is the reactance of the rotor. This reactance varies with frequency and hence varies with the rotor speed. The braking effect, or braking torque, of the eddy current brake is also affected by the reactance, but as has been indirectly indicated, is not appreciably affected by it over a wide range of speed changes, so that the braking effect, or braking torque, remains substantially constant for about half the speed range of the vehicle. It might be thought, however, that when changing the connections of windings 34, to change from a two-pole brake to a four-pole brake, that the increased frequency would so alter the reactance as to cause an abrupt change in retardation effect, and possibly cause shock to the vehicle being braked. Such is avoidable by selecting a speed for the changeover at which the braking effect of the two-pole brake is substantially the same as the braking effect of the four-pole brake, thus avoiding any possibility of shock. This changeover can of course be made entirely automatic, or it can be controlled at the will of an operator.

Where a vehicle is equipped with several driving motors, each motor having one of my improved eddy current brakes associated therewith, the windings 32 and 34 of the several brakes may be connected and controlled in groups, such as is indicated for two motors in Figs. 3 and 4.

As shown in Fig. 4, two vehicle motors 42 and 44 are geared to axles 46 and 48, respectively, forming the driving axles of one end of a vehicle, and each motor has associated therewith an eddy current brake 50.

In Fig. 3 the windings 32 and 34 are to be considered as being associated with one of the eddy current brakes 50 shown in Fig. 4, and the windings 32' and 34' as being associated with the other brake 50. The windings 32 and 32' are shown as being connected in series, although of course they may be designed to be connected in parallel. The same holds for windings 34 and 34'.

For controlling the supply of current to the windings as a group, a rheostat device, indicated diagrammatically at 52, is provided. The reversing switch 36, already described, is now provided for reversing the windings 34 and 34' as a group. Although schematically indicated for the sake of clearness, it will be obvious that the arrangement shown operates in the manner heretofore described.

While in the embodiment described I have referred principally to and illustrated only a brake having means for changing from two to four poles, it will be obvious that other numbers of poles may be used.

Therefore, while I have described only one specific embodiment of my invention, I do not desire to be limited to any details of construction other than by the spirit and scope of the appended claims.

Having now described my invention, what I claim as new and desire to secure by Letters Patent, is:

1. In an electro-dynamic brake, the combination of a rotor member, a stator member, windings associated with said stator member adapted to be connected to a source of current supply to produce alternate magnetic poles adjacent the rotor, and means for reversing the connections from said source to certain of said windings only to alter said poles.

2. In an eddy current brake, the combination of a rotor, a stator, a winding on the stator adapted to establish magnetic poles of relatively fixed polarity and of a given field intensity, a second winding on the stator adapted to establish magnetic poles of one polarity at one time and another polarity at another time of the same field intensity.

3. In an eddy current brake, the combination of a rotor, a stator, a winding on the stator adapted to have fixed connections with a source of current supply, and another winding on the stator adapted to have reversible connections with said source.

4. In an eddy current brake, the combination of a rotor, a stator, said stator having magnetic pole producing windings, and means for exciting certain of said windings with reverse current independent of excitation of the other of said windings to vary the magnetic poles produced by said windings.

5. In a vehicle brake apparatus, the combination of a pair of electric brakes, each of said brakes having a rotor and a stator provided with windings, the windings of one brake being interconnected with the windings of the other brake, and means for reversing certain of said windings while said brakes are being actuated.

6. In a vehicle brake apparatus, the combination of a pair of electric brakes, each of said brakes having a rotor and a stator provided with windings, the windings of one brake being interconnected with the windings of the other brake, and means for altering the connections of certain of said windings while said brakes are in operation to alter the effectiveness of said brakes.

7. In a vehicle brake apparatus, the combination of a rotor member and a stator member operable to produce a braking effect which diminishes as the speed of the vehicle diminishes, said stator member having a plurality of windings adapted to be energized to the same degree, and means for altering the connections of certain of said windings to vary said braking effect, said means being ineffective to vary the degree of energization of said windings.

8. In a vehicle brake apparatus, the combination of a rotor member and a stator member operable to produce a braking effect, said stator member having a plurality of windings associated therewith, a group of said windings being connected in parallel with the remainder of said windings, and means for reversing the parallel connection of one of said groups of windings.

9. In a vehicle brake apparatus, the combination of a rotor and a stator operable to produce a braking effect, a plurality of windings associated with said stator, said windings being connected in independent groups and each group being adapted to be connected to a source of current supply independent of the other group, and a switch device connected to one of said groups and adapted to reverse the connection from said group to said source of current supply.

10. In a vehicle brake apparatus, the combination of a rotor and a stator operable to produce a braking effect, a pair of windings associated with said stator and adapted to be connected in parallel to a source of current supply, and a switch device associated with one of said windings and adapted to reverse the connection between said winding and said source.

11. In a vehicle brake apparatus, the combination of a rotor member and a stator member operable to produce a braking effect, a plurality of windings associated with one of said members, said windings being arranged in series groups and said series groups being connected to a source of current supply in parallel, and a reversing switch device connected between one of said groups and said source.

12. In a vehicle brake system, the combination with a vehicle driving motor having a shaft, of a rotor secured to said shaft, a stator supported from said motor and coacting with said rotor to produce an electric braking effect, said stator having a plurality of pole pieces and windings disposed on said pole pieces, said windings being adapted to be connected to a source of current supply to be energized to a like degree, and a switch device connected to certain of said windings and adapted to reverse the direction of flow of current therein without diminishing the degree of energization of said windings.

13. In an eddy current brake device, the combination of a rotor and a stator operable to produce a braking effect, said stator having at least two pole members, a winding on each of said pole members, a circuit for connecting one of said windings direct to a source of current supply, a reversing switch device connected to said source of supply, and a circuit connecting the other of said windings to said switch device, said switch device being operable to vary the direction of flow of current in said last mentioned winding independent of the direction of flow and degree of current in said first mentioned winding.

14. In a vehicle brake apparatus, the combination of a rotor member and a stator member, windings associated with one of said members and adapted to produce a given number of magnetic poles of a given field intensity, and means for varying the direction of current flow in certain of said windings to produce a different number of magnetic poles of the same field intensity as said first number of magnetic poles.

15. In an electrodynamic brake device, the combination of a rotor and a stator adapted to produce a braking effect, a plurality of windings disposed on said stator and adapted when energized to produce a plurality of magnetic poles of a given field intensity, and means for reversing the direction of current flow in certain of said windings to produce a greater number of magnetic poles of the same field intensity as said first number of magnetic poles.

16. In an electrodynamic brake system, the combination of a plurality of electrodynamic brake devices, each of said devices having a plurality of windings, means for connecting at least one winding of one of said brake devices to at least one winding in another of said brake devices to form an interconnected winding group, means for connecting another winding of one of said brake devices to another winding in another of said brake devices to form a second interconnected group, and a switch device connected to one of said groups and operable to reverse the direction of current flow in said group independent of the direction of current flow in the other of said groups.

17. In an electrodynamic brake system, the combination of a plurality of electrodynamic brake devices, each of said devices having a rotor and a stator and including a plurality of exciting windings, means for connecting all of the windings of all of said brake devices in a plurality of series groups, each of said groups including portions of the windings in each of said brake devices, means for connecting said series groups in parallel to a source of current supply, and a reversing switch device connected to at least one of said series groups and operable to reverse the direction of current flow in said group.

18. In an electric brake system, the combination of at least two electric brake devices, each of said brake devices having a plurality of exciting windings, means for connecting the windings in one of said brake devices to the windings in the other of said brake devices to form a plurality of series groups, means for connecting said series groups in parallel to a source of current supply, a current regulating device for varying the current alike in said series groups, and a reversing switch device for reversing the direction of current flow in one of said groups independent of the current flow in the other of said groups.

19. In a vehicle brake system, the combination of a plurality of electrodynamic brake devices operable to produce a braking effect which diminishes as the speed of the vehicle diminishes, each of said brake devices having a rotor and a stator and windings on said stator adapted when energized to produce a given number of magnetic poles, means for interconnecting the windings of one brake device with the windings of the other brake device, means for connecting said windings to a source of current supply, and means for altering the connections of said windings at will while said brake devices are producing a braking effect to vary the magnetic poles produced by said windings.

20. In an electrodynamic brake apparatus, the combination of a rotor and a stator operable to produce a braking effect, windings on said stator adapted when energized to produce a given number of magnetic poles of a given field strength, and means for controlling current supplied to said windings and operable to cause said windings to produce a different number of magnetic poles of the same field strength as said first number of magnetic poles.

21. In an electrodynamic brake apparatus, the combination of a rotor and a stator operable to produce a braking torque which diminishes as the speed of the vehicle diminishes, one of said stator and rotor having windings associated therewith, and means for varying the connections of said windings while said apparatus is operating to produce at a low speed a torque corresponding to that produced at a high speed for the same degree of excitation.

GEORGE W. BAUGHMAN.